(12) United States Patent
Kanamaru et al.

(10) Patent No.: US 6,219,750 B1
(45) Date of Patent: Apr. 17, 2001

(54) DISK DRIVE HAVING CONTROL MECHANISM TO REDUCE OR ELIMINATE REDUNDANT WRITE OPERATIONS AND THE METHOD THEREOF

(75) Inventors: Atshushi Kanamaru, Sagamihara; Toshio Kakihara, Fujisawa; Hideo Asano, Machida; Atsushi Tobari, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/049,682

(22) Filed: Mar. 27, 1998

(30) Foreign Application Priority Data

Mar. 27, 1997 (JP) ..................................... 9-075139

(51) Int. Cl.[7] ..................................... G06F 12/08
(52) U.S. Cl. ............................................. 711/113
(58) Field of Search ................... 711/112, 113, 711/118, 154

(56) References Cited

U.S. PATENT DOCUMENTS 5,586,291 * 12/1996 Lasker et al. ..................... 711/113

* cited by examiner

Primary Examiner—Kevin L. Ellis
(74) Attorney, Agent, or Firm—Monica D. Lee; Abdy Raissinia (57) ABSTRACT

A disk drive and a control method thereof to reduce the number of write operations to a medium while minimizing command overhead time. A disk drive 10 comprises a hard disk controller (HDC) 13, a cache memory 14, and a host interface controller (HIC) 15 with a command queue for retaining a plurality of commands which are cached in cache memory 14. The HIC 15 performs the periphery interface processing by hardware. The disk drive 10 further comprises a local microprocessor unit (MPU) 16 for controlling the overall operation of HDD 10, including operations of HDC 13 and HIC 15. The local MPU 16 instructs the HIC 15 to write data to a medium by write commands cached in the cache memory 14. When local MPU 16 retrieves a command from a plurality of write commands cached in cache memory 14 which is completely overwritten by a command more recently issued, a write operation to the medium is not performed by the retrieved command.

6 Claims, 4 Drawing Sheets

FIG. 1

FIG. 2 Structure Example of Cache Memory (Command QUEUE)

DISK DRIVE HAVING CONTROL MECHANISM TO REDUCE OR ELIMINATE REDUNDANT WRITE OPERATIONS AND THE METHOD THEREOF

BACKGROUND OF THE INVENTION

1. Field of the Invention

The present invention relates to a disk drive such as a hard-disk drive (HDD) and a control method thereof, and more particularly to a disk drive with a cache memory and a control method thereof.

2. Description of Related Art

A hard-disk drive (HDD) is typically used as an auxiliary storage unit for an information processor (hereinafter referred to as a host). An HDD may include a cache memory for temporarily storing data supplied from the host or temporarily storing data read out from a magnetic disk until it is transferred to the host, and a controller for performing cache control.

If write data is supplied from the host, the controller retains the write data supplied in the cache memory and then releases the host from the write process. Concurrently, the controller controls further processing of the write data so that the write data retained in the cache memory is sequentially written to a magnetic disk (hereinafter referred to as a medium). Furthermore, the controller performs the reading of data from the medium in which it expects that the host will request and retains the read data in the cache memory. If data to be read is retained in the cache memory when there is a read request from the host, the data will be supplied to the host. If such cache control is performed, the access speed of an HDD is improved.

Conventional low-end HDDs often adopt a method in which the intervention of the microprocessor (hereinafter referred to as a local MPU) of the HDD is minimized with respect to the peripheral interfacing processes while the host interface controller (HIC) performs the majority of the peripheral interfacing processes by hardware. This conventional approach often improves the performance of the HDD by reducing the command overhead time.

For example, the data transfer between an external host and a cache memory may be performed under the control of an HIC without intervention of a local MPU while the data transfer between the medium and the cache memory may be performed by a hard disk controller (HDC) under the control of the local MPU.

More specifically, when data is written to a medium by a write command from a host, the following steps may be performed:

(1) Once the HIC transfers data from the host to the cache memory, the HIC notifies the local MPU that a command from the host was received. In response to this, the local MPU commands the HDC to write the data stored in the cache memory onto the medium. Thus, the HDC transfers the data stored in the cache memory to the medium.

(2) The HIC then notifies the local MPU that the data transfer from the host to the cache memory has been completed, while the HDC notifies the local MPU that the write operation to the medium has been completed.

The operations of the HIC and the local MPU are described in further detail below. If the HIC receives a write command from the host, it will start the data transfer to the cache memory immediately without intervention from the local MPU and notify the local MPU that the transfer of data from the host to the cache memory has started. When the data transfer is completed and also the cache memory has an acceptable vacancy (e.g., 1 block) for the next write command, the HIC notifies the local MPU that the command is completed. This notification is performed so that when the next write command is received, it can be transferred immediately to the cache memory, which is the standard for systems having an integrated device electronics (IDE) interface.

In the aforementioned operation, if there is a sufficient vacancy on the cache memory, the HIC by itself will notify the host of the completion of the command to the host, regardless of the write process being performed by the local MPU. The HIC receives the next write command from the host and performs data transfer based on the next write command. This allows the HIC to fetch as many commands as possible from the host, thereby improving the performance of the HDD. In order to perform the aforementioned operation, a command queue is provided in the cache memory for retaining the command type in the cache memory.

Figure 2:
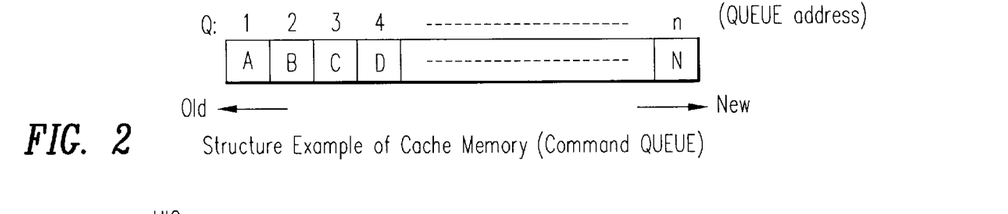
FIG. 2 illustrates a command queue for a cache memory according to one embodiment of the present invention.

FIG. 2 shows the structure of the command queue in the cache memory. According to FIG. 2, Q (=1, 2, ..., and n) denotes a queue address and A, B, C, D, ..., and N denote commands retained in the cache memory. In the command queue, older commands are cached in order of A, B, C, D, ..., and N. Each time a command is received, the number of queue addresses is increased, and if older commands are executed in sequence, the number of queue addresses will be decreased. The management of the command queue is performed by the HIC, and the local MPU fetches the commands with the queue addresses.

If the local MPU commands the HDC to write data to a medium, the write command retained in the command queue is executed by the HDC, and data is written to the medium. Also, the data read out from the medium is transferred to the cache memory by the HDC and is transferred to the host by the HIC.

Unfortunately, an HDD using this conventional method which retains the write commands in a command queue has several drawbacks.

For example, since the write commands retained in the command queue are executed in sequence to write data to the medium, the same write operation to the medium is repeated in the case where the same command is repeatedly issued and retained in the command queue, and consequently, unnecessary access is implemented. Referring now to the command queue structure shown in FIG. 2, in the case where the same command is repeatedly cached in the cache memory (e.g., command A, command B, command A, command B, command A, command B, . . . ), the data written to the medium by older commands A and B is completely overwritten by execution of newer commands A and B, and consequently, only the data written to the medium by the last commands A and B will remain. This leads to unnecessary access resulting in performance degradation.

In such a write operation performed by an HDD, the time required for data transfer, such as latency time, is incommensurably long compared with the data transfer between a cache memory and a host.

SUMMARY OF THE INVENTION

It is an object of the present invention to provide a disk drive and a control method thereof which are capable of improving the overall performance of a storage device by reducing the performance degradation caused by executing duplicate commands when the same command is repeatedly executed at the same address at predetermined intervals.

A disk drive according to the present invention comprises: (a) a disk storage medium; (b) a disk controller for controlling data read and write operations with respect to the disk storage medium; (c) a cache memory for retaining data which is written to the disk storage medium; (d) a host interface controller for transferring data between a host and the cache memory by hardware; and (e) a microprocessor for controlling the overall operation of the drive, including the operation of transferring data between the disk storage medium and the cache memory. The host interface controller includes a command queue to retain a plurality of commands cached in the cache memory. The host interface controller notifies the microprocessor of the start of the data transfer by execution of a command and a completion of the data transfer by a completion of the command. If the microprocessor receives notification of the start of the data transfer from the host interface controller, the microprocessor instructs the disk controller to write data to the disk storage medium by write commands cached in the cache memory. The microprocessor retrieves a command among a plurality of commands cached in the cache memory and determines whether the retrieved command is completely overwritten by a command more recently issued. If so, the microprocessor controls the write processing such that data is not written to the disk storage medium by the retrieved command.

A control method according to the present invention is applied to a disk drive, which comprises (a) a disk controller for controlling data read and write operations with respect to a disk storage medium, (b) a cache memory for retaining data which is written to the disk storage medium, (c) a host interface controller for transferring data between a host and the cache memory by hardware, and (d) a microprocessor for controlling the overall operation of the drive, including the operation of transferring data between the disk storage medium and the cache memory. The control method includes the steps of: (a) performing the data transfer from the host to the cache memory if the host issues write commands, and notifying the microprocessor of the start of the data transfer and the completion of the data transfer by execution of the write commands; (b) commanding the disk controller to write data to the disk storage medium by write commands cached in the cache memory, if a notification of the start of the data transfer is received from the host interface controller; and (c) if there is a command among a plurality of write commands cached in the cache memory which is completely overwritten by a command more recently issued, performing control in which data is not written to the disk storage medium by the command which is completely overwritten.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

For one embodiment of the present invention, the disk controller is instructed to write data to the disk storage medium with write commands cached in a cache memory. It is determined whether a command retrieved among a plurality of commands cached in the cache memory is completely overwritten by a command more recently issued such that a write operation to the medium is not performed by the retrieved command. Accordingly, the number of write operations to the medium is reduced and the entire performance of the drive can be improved.

Figure 1:
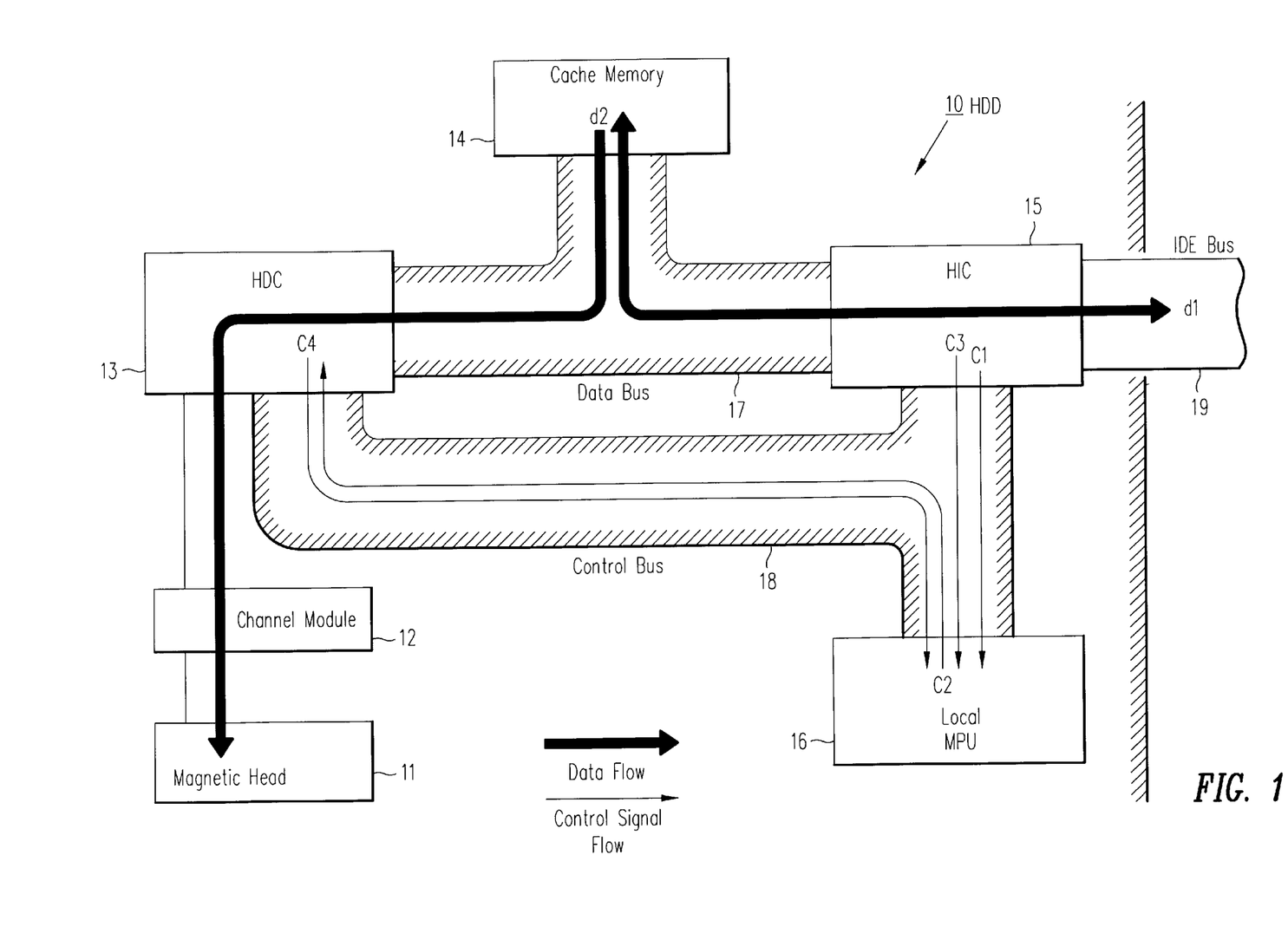
FIG. 1 is a block diagram of a disk drive according to one embodiment of the present invention.

The present invention is well suited for low-end hard-disk drives (HDDs) having an Integrated Device Electronics (IDE) interface. FIG. 1 is a block diagram of a disk drive 10 according to one embodiment of the present invention. According to FIG. 1, the thick arrows represent the data paths and the thin arrows represent the control paths.

In FIG. 1, disk drive (HDD) 10 includes a magnetic head 11 for reading data from and writing data to a magnetic disk (not shown) and a channel module 12 which includes an amplifier for signal detection, a waveform shaping circuit, an analog-to-digital converter (ADC), and a digital/analog converter (DAC). The HDD 10 also includes a hard disk controller (HDC) 13 for controlling the data write and read operations to and from the magnetic disk, a cache memory 14 for storing write data, a host interface controller (HIC) 15 for providing an interface between HDD 10 and a host by hardware, and a local microprocessor unit (MPU) 16 for controlling the overall operation of HDD 10, including the operation of the HDC 13 and the HIC 15.

The HDC 13, cache memory 14, and HIC 15 are coupled via a data bus 17. The HDC 13 and HIC 15 are coupled to the local MPU 16 via a control bus 18. The HIC 15 is coupled to an external host by an IDE bus 19.

The cache memory 14 has the capacity to store data of a few hundred times a recording unit (sector) on a magnetic disk or more, for example, 128K bytes (256 blocks). For one embodiment, 1 block=1 sector=512 bytes in a cache memory. Note that the host coupled to HDD 10 via IDE bus 19 may consider a plurality blocks in cache memory 14 as 1 block. For example, the host can specify 1, 2, 4, 8, 16, or 32 sectors as 1 block.

The HIC 15 includes internal memory for storing all information required for transferring data, and transfers data between a host and the cache memory 14 by hardware without intervention from local MPU 16.

The HDC 15 includes internal memory that stores information about the corresponding relationship between an address on the cache memory 14 and the magnetic disk, and the number of blocks consecutively recorded in a cache table.

If the host provides write data, HIC 15 retains the write data in cache memory 14 and then releases the host from further write processing. The HIC 15 also notifies local MPU 16 that it received a command from the host.

The HIC 15 includes a command queue for managing commands which are cached in cache memory 14. FIG. 2 illustrates the command queue for one embodiment of the present invention. According to FIG. 2, Q (=1, 2, ..., and n) denotes a queue address and A, B, C, D, ..., and N denote commands held in cache memory 14. In this embodiment, the queue address n is 32 and 32 write commands can be held.

When the host issues a read command, HIC 15 compares the address of the issued command with the aforementioned cache table, and notifies local MPU 16 of the hit state of a block which has the highest hit ratio (i.e., the block which not only has the most hits but meets some other requirement such as the head of the block is a hit). The HIC 15 determines whether or not the data requested from the host is in cache memory 14 and how many blocks are to be transferred without intervention of local MPU 16.

The local MPU 16 which is a microprocessor, executes control programs and includes a memory for storing control programs and data. The local MPU 16 is responsible for controlling the overall operation of HDD 10. The local MPU 16 also controls the operation of HDC 13 and HIC 15, based on the commands and control data which are supplied from HIC 15 and the host. That is, if HIC 15 notifies local MPU 16 of the command information and the hit information on that command received from the host, local MPU 16 controls the HIC 15, based on this information.

Particularly, when predetermined conditions are satisfied, the local MPU 16 determines whether a write command retrieved among a plurality of write commands cached in the cache memory 14 is completely overwritten by a write command more recently issued. Furthermore, local MPU 16 controls the write processing such that a write operation to a medium is not performed by the retrieved command which is completely overwritten. In this way the write performance of HDD 10 is improved.

Thus, HDD 10 includes an IDE interface and cache memory 14 which is coupled to data bus 17. The HDD 10 can cache a plurality of write commands in cache memory 14. The HIC 15 can perform data transfers between HIC 15 and cache memory 14 without intervention of local MPU 16. On the other hand, the data transfer between medium and cache memory 14 requires intervention of local MPU 16.

In order to avoid overwriting data to a medium the following method is performed before execution of a write operation. Commands are retrieved from a cache memory to detect whether or not the data is completely overwritten by a command more recently issued in the cache memory. In the case where the data is overwritten by the retrieved command, a command which is overwritten is not executed.

For one embodiment, all commands cached in the cache memory are retrieved such that a duplicate comparison can be performed for all commands. In the case where even one set of commands is a duplicate of another set, the time it takes to write the data corresponding to that command can be shortened because the duplicate command is not executed. The local MPU 16 requires command overhead time to perform such a duplicate comparison. If the write execution time which is actually shortened is greater than the increase of the command overhead time for comparison, the performance of HDD 10 is improved. On the other hand, when there is almost no duplication of cached commands (e.g., in the case when entire random access is performed), the command overhead time is increased without decreasing the write execution time, causing the performance of the disk drive to be degraded. For example, if 32 commands are cached by complete random access, the number of comparisons will reach 31+30+29+ . . . +3+2+1, or 496. However, the case of entire random access is typically rare. In the access of recent operating systems (OSs) equipped with a system cache such as Smart Drive, the same address is often accessed repeatedly at a predetermined length at certain intervals with access to a file allocation table (FAT).

Therefore, the present invention performs a cache operation in accordance with the following algorithm for an HDD which can cache a plurality of write commands, thereby improving the performance of the HDD.

(1) A write operation to a medium is not performed by a command (hereinafter referred to as a retrieved original command) which is completely overwritten by a command more recently issued.

(2) A determination of whether or not to retrieve a write command meeting the aforementioned condition (1) is not made for all commands cached but is made in the following method.
  i) The decision to retrieve a command is made only for a predetermined number (hereinafter referred to as a comparison limiting number) of commands that are consecutive to the original command retrieved.
  ii) Retrieval is executed only when the length of the original command retrieved is equal to or less than n (length limiting number).

(3) There are two methods to determine the comparison limiting number. For the first method, a fixed value is previously provided which depends on the environment in which an HDD is used. For the second method, a value is dynamically comparing the result.

(4) The comparison limiting number may be dynamically changed according to the following method.
  i) Each time the retrieving rate in the past retrieval is above a certain fixed value, the comparison limiting number is increased within a predetermined upper limit. That is, if more commands are found, a retrieval range will be made wider.
  ii) Each time the retrieving rate in the past retrieval is below a certain fixed value, the comparison limiting number is reduced within a predetermined lower limit. That is, if less commands are found, a retrieval range will be made narrower.

The operation of the HDD 10 is described below. The thick arrows in FIG. 1 show the data path in the case where a write command from a host is cached and data is written to a medium by the cached command.

If data from a host is cached once in cache memory 14 through HIC 15, HIC 15 notifies local MPU 16 that it received a command from the host. In response to this, local MPU 16 sends HDC 13 a command to write the data stored in cache memory 14 to the medium. The HDC 13 transfers the data stored in cache memory 14 to the medium.

The HIC 15 then notifies local MPU 16 that the data transfer from the host to cache memory 14 is completed, while HDC 13 notifies local MPU 16 that the write operation to the medium is completed.

Figure 3:
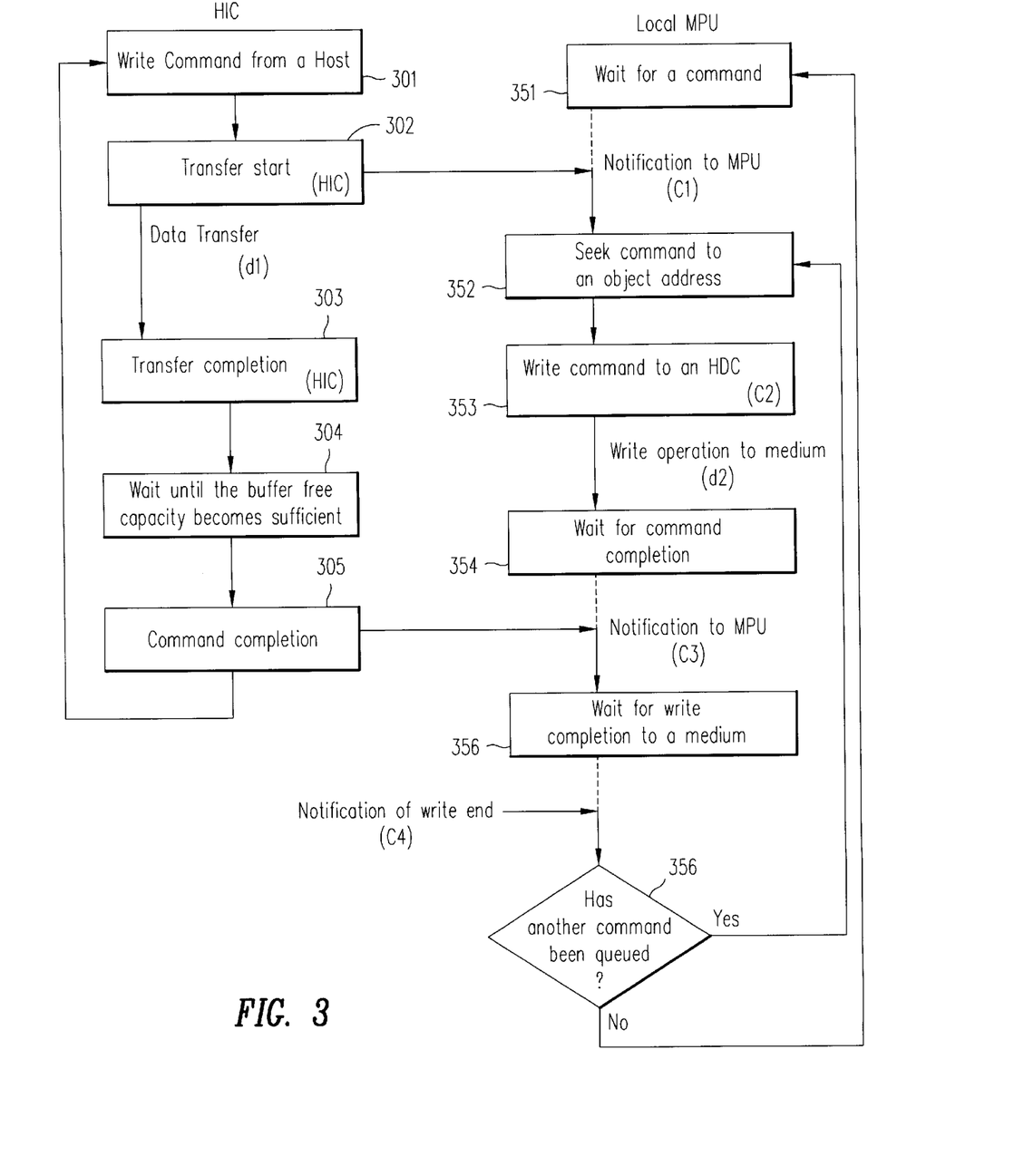
FIG. 3 is a flowchart illustrating the operation of the disk drive.

FIG. 3 is a flowchart showing the operations performed by HIC 15 and local MPU 16 when a write command is issued by the host. The left side of the flowchart shows the operations performed by HIC 15 and the right side of the flowchart shows the operations performed by local MPU 16.

First of all, if the host issues a write command in step 301, HIC 15 receives the write command from the host. In step 302, HIC 15 immediately starts transferring data to cache memory 14 without intervention from local MPU 16 (see arrow d1 in FIGS. 1 and 3). At the same time, HIC 15 notifies MPU 16 that the data transfer is starting, as shown by arrow C1 in FIGS. 1 and 3.

In step 303, the data transfer to the cache memory 14 is completed. In step 304, HIC 15 waits until cache memory 14 has an acceptable vacancy (e.g., 1 block) for the next write command. Once there is an acceptable vacancy for the next write command, HIC 15 notifies local MPU 16 that the current write command is completed (see 305). The flowchart returns to stop 301 to process the next write command received from the host. The arrow C3 shown FIGS. 1 and 3 represents HIC 15 notifying local MPU 16 that the current write command is completed.

Simultaneously with the aforementioned operation of HIC 15 described in steps 301–305, local MPU 16 performs the process described by steps 351–356.

First of all, in step 351, local MPU 16 waits for a command. Once local MPU 16 receives notification that data is starting to be transferred to cache memory 14 from HIC 15, local MPU 16 performs a seek command to seek an object address of data in cache memory 14. In step 353, local MPU 16 commands HDC 13 to write data (arrow C2 in FIGS. 1 and 3). Step 353 and 354 are provided for executing the aforementioned algorithm. Steps 353 and 354 will be described in more detail with reference to FIGS. 4 and 5.

Once HDC 13 receives a write command from local MPU 16, HDC 13 starts transferring data from cache memory 14 to the medium. Thus, data is written onto the medium. This data flow is shown by arrow d2 in FIGS. 1 and 3.

Next, in step 354 local MPU 16 waits until it receives notification from HIC 15 that the write command is completed (arrow C3 in FIGS. 1 and 3). Then in step 355, local MPU 16 waits for HDC 13 to provide notification of write completion (arrow C4 in FIGS. 1 and 3).

In step 356, local MPU 16 determines whether another command has been queued, by referring to the command queue shown in FIG. 2. When another command has been queued, local MPU 16 returns to step 352 to repeat steps 352—356 for the next command. If another command is not queued, local MPU 16 will return to step 351 to wait for the next command.

During the write command operation, if there is a sufficient vacancy in cache memory 14, HIC 15 notifies the host that the command is completed regardless of the status of the write process (in steps 353 and 354) in local MPU 16. The HIC 15 receives the next write command from the host and performs the data transfer based on the next write command. In this way, HIC 15 transfers as many commands as possible into cache memory 14 to improve the performance of the HDD 10. This is accomplished by having HIC 15 repeat the process described by steps 301 through 305 independent of the process described by steps 351 through 356 performed by local MPU 16.

For one embodiment of the present invention, the performance of HDD 10 is improved by performing a cache operation in accordance with the steps described in FIG. 3 in which a plurality of write commands are cached in the aforementioned way.

Figure 4:
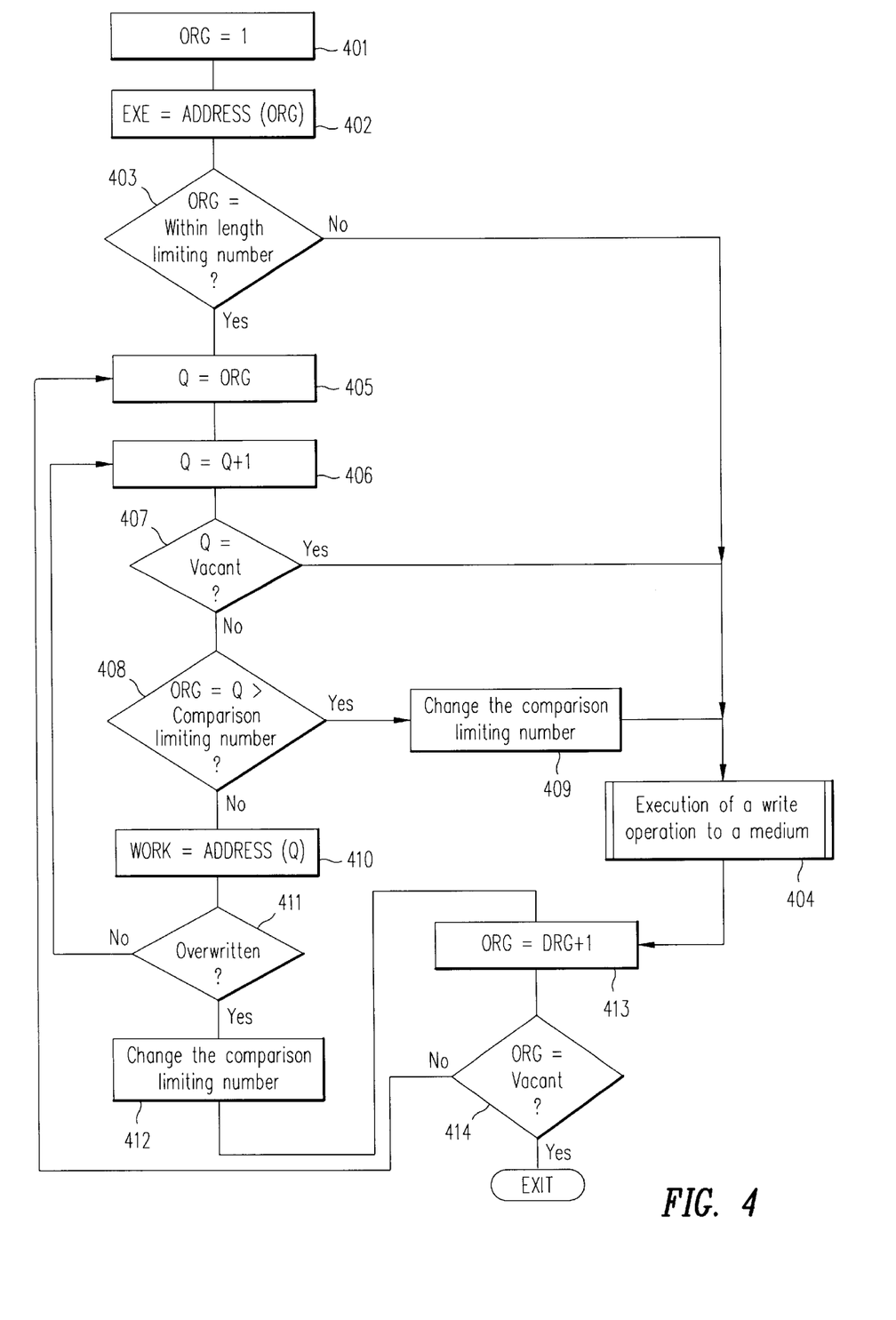
FIG. 4 is a flowchart illustrating the operation of a local MPU of the disk drive.

FIG. 4 is a flowchart that describes steps 353 and 354 in FIG. 3 in more detail. In step 401, the address of the oldest command queue cached is stored in register ORG. In the structure of the command queue shown in FIG. 2, the maximum value of the queue address is 32, so 32 commands can be held in total. The address 1 of the oldest command queue cached is stored in the ORG (ORG=1).

Then, in step 402 the write address of an actual write command based on the address (at first, address 1) of the command queue stored in the ORG and the length (which represents from where and how many blocks of data are written) are obtained. In step 403, it is determined whether or not the length of the original command retrieved is within the length limiting number n (for example, n=3, that is, 3 blocks).

If the length of the original command retrieved is not within the length limiting number, local MPU 16 advances to step 404. In step 404, the process of writing data to the medium is immediately executed. More specifically, MPU 16 commands HDC 13 to write data to the medium. Therefore, when the length of the original command retrieved is not within the length limiting number, the overhead time may be minimized.

If the length of the original command retrieved is within the length limiting number, MPU 16 advances to step 405. In step 405, the address of the command queue stored in the ORG register is stored in register Q (Q=ORG). In step 406, the address of the command queue stored in the register Q is set to the queue address (Q=Q+1) of the next oldest command which becomes an object of retrieval. For example, in this case, in the structure of the command queue shown in FIG. 2, retrieval is performed on the address 2 of the command queue.

In step 407 it is determined whether or not a command is retained in the queue address Q. If no command is in the queue address Q, (i.e., there is no command to be retrieved) local MPU 16 will advance to step 404.

On the other hand, if a command is retained in the queue address Q, MPU 16 advances to step 408. In step 408 it is determined whether or not the command in the queue address Q has exceeded the comparison limiting number. The comparison limiting number indicates the number of consecutive blocks in the original command retrieved. If it exceeds the comparison limiting number, MPU 16 determines that it does not meet the conditions for retrieval and advances to steps 404 through 409. In step 409 the process of reducing the comparison limiting number is performed according to a predetermined condition. Steps 409 and 412 (to be described later) describes a process of dynamically reducing or increasing the comparison limiting number. An example of dynamically changing the comparison limiting number is described in more detail below with reference to FIG. 5. For an alternative embodiment, steps 409 and 412 may be eliminated.

In step 408, if a command is within the comparison limiting number, MPU 16 determines it can be retrieved and advances to step 410. In step 410 the write address and the length (which represents from where and how many blocks of data are written) are obtained. Step 411 determines whether or not it is a command completely overwritten.

If the command is not a command that is completely overwritten, MPU 16 returns to step 406 and the process described by steps 406–410 is repeated on the queue address of the next oldest command.

If it is a command that is completely overwritten, MPU 16 advances to steps 413 through 412. In step 412, the process of increasing the comparison limiting number is performed according to a predetermined condition. In step 413, the ORG register is set to the address (ORG=ORG+1) of the next oldest command queue. In this case, because the address of the next oldest command queue is processed without performing the write execution process to the medium in step 404, unnecessary access to a medium is eliminated.

Step 414 determines whether or not the queue address of the command queue is vacant (ORG=vacant?). If it is vacant, MPU 16 determines that no command has been queued in cache memory 14 and ends the process shown in FIG. 4. If it is not vacant, MPU 16 returns to step 405 and repeats the aforementioned process for the next queue address.

An example of dynamically changing the comparison limiting number is described below. For one embodiment, the comparison limiting number is executed according to the following method.

The lower limit of the comparison limiting number is set to 3 and the upper limit to 15. For this example, 50 consecutive write commands represent the object of retrieval. The comparison limiting number is dynamically changed as follows. Note that when the object of retrieval contains a command which is completely overwritten, this is called a hit. In the case where there is a hit, the comparison limiting number is increased by +3. In the case where there is no hit, the comparison limiting number is reduced by −1.

Figure 5:
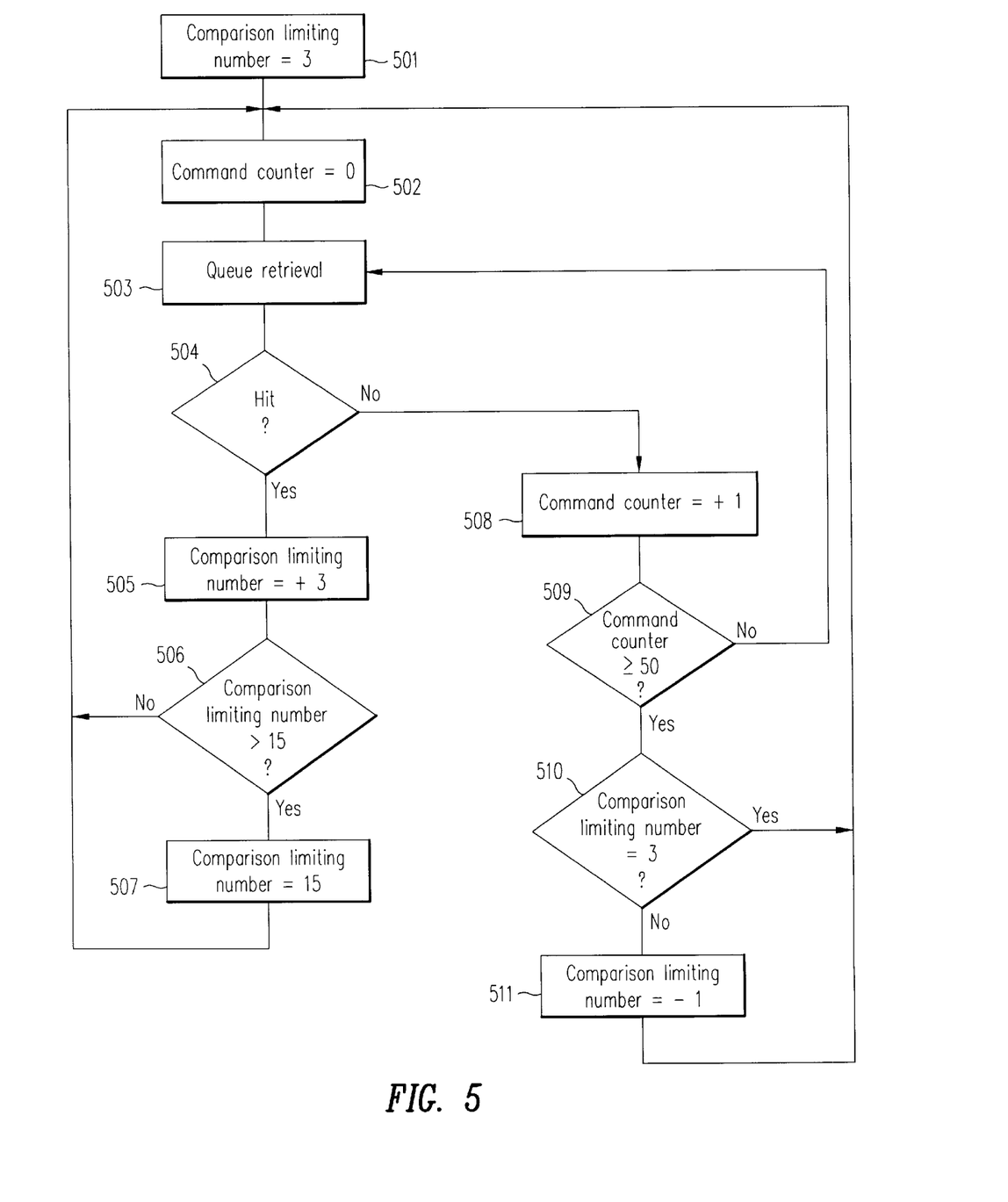
FIG. 5 is a flowchart illustrating a method of dynamically changing a comparison limiting number of the disk drive.

FIG. 5 is a flowchart showing the dynamically changing process for the comparison limiting number using the set conditions described above. Note that the dynamically changing process is executed in steps 409 and 412 shown in FIG. 4.

In step 501, the comparison limiting number is set to the lower limit, that is, 3 and in step 502 a command counter is set to 0. Once the method shown in FIG. 5 is started, the retrieval range is narrowed as much as possible to minimize the overhead time, and as this method is performed, the retrieval range is enlarged to improve the hit ratio of the commands.

Then, in step 503 the retrieval of a queue is performed by comparing 1 command given by a command counter with the retrieved original command. Next, in step 504 it is determined whether or not there is a hit in 50 continuous commands. If there is a hit, in step 505 the comparison limiting number will be increased by +3. In step 506 it is determined whether or not the comparison limiting number exceeds the upper limit, 15. If the comparison limiting number exceeds the upper limit of 15. the comparison limiting number is set to the upper limit of 15 as shown in step 507. Then, MPU 16 returns to step 502 to check the next hit.

On the other hand, in step 504, if there is no hit in 50 consecutive commands, the command counter will be incremented by +1 (see step 508). In step 509 it is determined whether or not the count of the command counter is 50 or more.

If the count of the command counter is less than 50, the process returns to step 503 to continue the retrieval of the queue. If the count is 50 or more, the process advances to step 510. In step 510, it is determined whether or not the comparison limiting number is 3, that is, the lower limit.

If the comparison limiting number is 3, the process returns to step 502 to check the next hit again. If the comparison limiting number is not 3 in step 511, it will be reduced by −1 and the process will return to step 502.

In the case where 50 consecutive write commands contain a command which is completely overwritten, the comparison limiting number is increased by +3 between the lower limit 3 and the upper limit 50 of the comparison limiting number. On the other hand, in the case where they do not contain a command which is completely overwritten, the comparison limiting number is reduced by −1. Thus, dynamically changing the comparison limiting number can be accomplished.

The HDD 10 for one embodiment of the present invention includes a magnetic head 11, channel module 12, HDC 13, cache memory 14, and HIC 15 with a command queue for retaining a plurality of commands which are cached in cache memory 14. The HIC 15 provides an interface between HIC 15 and the host. The HDD 10 also includes local MPU 16 for controlling the overall operation of HDD 10, including the operations of HDC 13 and HIC 15.

The local MPU 16 instructs HIC 15 to write data to a medium by write commands cached in cache memory 14.

The local MPU 15 retrieves a command which is completely overwritten by a command more recently issued, and a write operation to the medium is not performed by the retrieved command. Therefore, when the same command is repeatedly performed at the same address at predetermined intervals, the number of write operations to the medium can be reduced and the entire performance of the drive can be improved, while minimizing a degradation in the performance which is caused by execution of a duplicate command.

For one embodiment of the present invention, even when the comparison limiting an improvement of about 5 to 12% in the speed is achieved as compared with a conventional HDD.

Although the present invention has been described with respect to HDD 10, the present invention is not limited to HDDs. For alternative embodiments, the present invention may be extended to any drive with a cache memory. For example, the invention may be extended to various external storage devices, such as magneto-optical disk systems.

Additionally, for the aforementioned embodiment, although the comparison limiting number has been dynamically changed, for alternative embodiments, the comparison limiting number may be a fixed value. It is important to note that among the plurality of write commands cached in the cache memory, if a command, which is completely overwritten by a more recently issued command, is under a predetermined condition, a write operation to a medium is not performed.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A disk drive comprising:

a rotatable disk;

a head positioned to perform write operations;

a host interface controller configured to receive write data and write commands from a host for performing said write operations;

a cache memory coupled to said host interface controller, and configured to store said write commands and said write data;

a disk controller coupled to said cache memory and including a memory device configured to store a command queue for managing a plurality of write commands cached in said cache memory; and a microprocessor coupled to said disk controller and said host interface controller, said microprocessor configured to instruct said disk controller to transfer said write data from said cache memory to said disk based on said write commands stored in said cache memory, said microprocessor retrieving a predetermined number of consecutive write commands stored in said cache memory and determining whether any one of said predetermined number of consecutive write commands is overwritten by a more recently issued one of said write commands, said microprocessor preventing said write data to be written to said disk if said one of said predetermined number of consecutive write commands is overwritten.

2. The disk drive of claim 1, wherein the predetermined number is dynamically altered according to a predetermined standard.

3. The disk drive of claim 1, wherein the predetermined number is statically set.

4. A disk drive comprising:

a rotatable disk;

a head positioned to perform write operations;

a host interface controller configured to receive write data and write commands from a host for performing said write operations;

a cache memory coupled to said host interface controller, and configured to store said write commands and said write data;

a disk controller coupled to said cache memory and including a memory device configured to store a command queue for managing a plurality of write commands cached in said cache memory; and a microprocessor coupled to said disk controller and said host interface controller, said microprocessor configured to instruct said disk controller to transfer said write data from said cache memory to said disk based on said write commands stored in said cache memory, said microprocessor retrieving at least one write command stored in said cache memory having a predetermined length and determining whether said at least one write command is overwritten by a more recently issued one of said write commands, said microprocessor preventing said write data to be written to said disk if said at least one write command is overwritten.

5. A method of controlling write operations in a disk drive, comprising the steps of:

(a) receiving at least one write command from a host;

(b) transferring write data to a cache memory without intervention from a local microprocessor;

(c) notifying said local microprocessor of the start and completion of each of said write commands;

(d) retrieving a predetermined number of write commands; and (e) transferring write data from said cache memory to said disk if a corresponding write command of said predetermined number of write commands is not completely overwritten by a more recently issued write command.

6. A method of controlling write operations in a disk drive, comprising the steps of:

(a) receiving at least one write command from a host;

(b) transferring write data to a cache memory without intervention from a local microprocessor;

(c) notifying said local microprocessor of the start and completion of each of said write commands;

(d) retrieving at least one write command with a predetermined length; and (e) transferring write data from said cache memory to said disk if said at least one write command is not completely overwritten by a more recently issued write command.

* * * * *